US009450954B2

(12) United States Patent
Sharif et al.

(10) Patent No.: US 9,450,954 B2
(45) Date of Patent: Sep. 20, 2016

(54) FORM FILLING WITH DIGITAL IDENTITIES, AND AUTOMATIC PASSWORD GENERATION

(71) Applicant: Microsoft Technology Licensing, LLC, Redmond, WA (US)

(72) Inventors: Tariq Sharif, Issaquah, WA (US); Arun K. Nanda, Sammamish, WA (US); Roberto A. Franco, Seattle, WA (US); Richard Randall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/563,506

(22) Filed: Dec. 8, 2014

(65) Prior Publication Data

US 2015/0096000 A1 Apr. 2, 2015

Related U.S. Application Data

(62) Division of application No. 12/188,971, filed on Aug. 8, 2008, now Pat. No. 8,910,256.

(51) Int. Cl.
*H04L 29/06* (2006.01)
*G06F 21/31* (2013.01)
*H04L 29/08* (2006.01)

(52) U.S. Cl.
CPC .............. *H04L 63/083* (2013.01); *G06F 21/31* (2013.01); *H04L 63/102* (2013.01); *H04L 63/168* (2013.01); *H04L 67/02* (2013.01); *H04L 67/1097* (2013.01)

(58) Field of Classification Search
CPC ..... H04L 63/08; H04L 63/10; H04L 63/102; H04L 63/20; G06F 21/30; G06F 21/31; G06F 17/243; H04H 60/20; H04H 60/27; H04H 60/35; H04H 60/37; H04H 60/377; H04H 60/68; H04H 60/73; H04H 60/76; H04H 60/82; H04H 60/87

See application file for complete search history.

(56) References Cited

U.S. PATENT DOCUMENTS

| 6,000,033 A * | 12/1999 | Kelley | G06F 21/31 709/225 |
| 6,182,229 B1 * | 1/2001 | Nielsen | G06F 21/41 713/170 |

(Continued)

FOREIGN PATENT DOCUMENTS

| JP | 2006011894 A | 1/2006 |
| KR | 20010069540 | 7/2001 |

OTHER PUBLICATIONS

Chappell, David, "Introducing Windows CardSpace", Apr. 2006, Chappell & Associates, http://msdn.microsoft.com/en-us/library/aa480189.aspx (13 pages).*

(Continued)

*Primary Examiner* — Eric W Shepperd
(74) *Attorney, Agent, or Firm* — Aneesh Mehta; Micky Minhas

(57) ABSTRACT

In one implementation, form field(s) of a form of a website or application are populated with data obtained using a digital identity, and the populated form field(s) are submitted to the website or application. A form field specification specifying information about the form fields of the form is obtained. A user selects or creates a digital identity. Data is obtained using the digital identity, and the data is used to provide values to the form. The data is submitted to the website or application. In another implementation, a username and password are automatically generated. The username and password that are generated meet parameters that may be specified by the website or application. The username and password are submitted to the website or application for a purpose such as registration or authentication, and stored away for future authentication.

20 Claims, 5 Drawing Sheets

(56) References Cited

U.S. PATENT DOCUMENTS

| | | | |
|---|---|---|---|
| 6,192,380 B1 | 2/2001 | Light | |
| 6,279,157 B1* | 8/2001 | Takasu | H04H 20/14 375/E7.024 |
| 6,490,601 B1 | 12/2002 | Markus et al. | |
| 6,496,937 B1* | 12/2002 | Ichihara | G06F 21/31 726/6 |
| 6,629,246 B1* | 9/2003 | Gadi | H04L 63/0815 726/28 |
| 6,826,700 B1* | 11/2004 | Germscheid | G06F 21/31 713/183 |
| 7,155,739 B2 | 12/2006 | Bari | |
| 7,870,597 B2 | 1/2011 | Satish et al. | |
| 2001/0056487 A1 | 12/2001 | Yoo | |
| 2002/0023059 A1 | 2/2002 | Bari | |
| 2002/0023108 A1 | 2/2002 | Daswani | |
| 2002/0055909 A1 | 5/2002 | Fung | |
| 2003/0005299 A1* | 1/2003 | Xia | G06F 21/31 713/171 |
| 2004/0054797 A1* | 3/2004 | Lin | G06Q 20/382 709/229 |
| 2004/0205243 A1 | 10/2004 | Hurvig et al. | |
| 2005/0091495 A1 | 4/2005 | Cameron | |
| 2005/0149854 A1 | 7/2005 | Pennell et al. | |
| 2005/0177731 A1 | 8/2005 | Torres | |
| 2005/0183003 A1 | 8/2005 | Peri | |
| 2005/0229240 A1* | 10/2005 | Nanba | G06F 21/34 726/6 |
| 2006/0059434 A1 | 3/2006 | Boss et al. | |
| 2007/0204325 A1 | 8/2007 | Cameron | |
| 2007/0208869 A1 | 9/2007 | Adelman | |
| 2007/0226783 A1* | 9/2007 | Mimlitsch | H04L 63/0815 726/4 |
| 2007/0234408 A1 | 10/2007 | Burch et al. | |
| 2007/0250916 A1 | 10/2007 | Shull | |
| 2008/0071808 A1 | 3/2008 | Hardt | |
| 2009/0182717 A1 | 7/2009 | Zilberfayn et al. | |
| 2009/0300097 A1 | 12/2009 | Meyer | |
| 2010/0017889 A1 | 1/2010 | Newstadt et al. | |
| 2010/0031328 A1 | 2/2010 | Hodgkinson | |
| 2010/0037303 A1 | 2/2010 | Sharif | |
| 2010/0274859 A1 | 10/2010 | Bucuk | |

OTHER PUBLICATIONS

Introducing Windows CardSpace, David Chappell, Chappell & Associates, Apr. 2006. http://msdn.microsoft.com/en.us/library/aa480189.aspx (13 Pages).

The Laws of Identity, Kirk Cameron, Microsoft Corporation, May 12, 2005 http://www.identityblog.com/stories/2005/05/13/TheLawsOfIdentity.pdf (12 Pages).

A User Friendly Internet Identity Management System http://www.ptithcm.edu.vn/ICACT%202008/pdf/tech/06f-02.pdf (4 Pages).

Identity Metasystem http://www.techweb.com/encyclopedia/defineterm.jhtml?term=identity+metasystem (4 Pages).

Perpetual Motion http://www.perpetual-motion.com/ 2 (Pages).

Windows CardSpace and the Identity Metasystem http://cardspace.netfx3.com/files/folders/7652/download.aspx (64 Pages).

A Guide to Using the Identity Selector Interoperability Profile V1.0 within Web Applications and Browsers http://download.microsoft.com/download/1/1/a/11ac6505-e4co-4e05-987c-6f1d31855cd2/Identity-Selector-Interop-Profile-v1-Web-Guide.pdf (14 Pages).

Office Action cited in U.S. Appl. No. 12/188,971, mailed Aug. 26, 2011.

Office Action cited in U.S. Appl. No. 12/188,971, mailed Feb. 13, 2012.

Office Action cited in U.S. Appl. No. 12/188,971, mailed Aug. 17, 2012.

Office Action cited in U.S. Appl. No. 12/188,971, mailed Dec. 19, 2013.

"Fifth Office Action Received for China Patent Application No. 200980130775.8", Mailed Date: Nov. 22, 2013, Filed Dated: Jul. 28, 2009, 8 pages.

"Final Rejection Received for China Patent Application No. 200980130775.8", Mailed Date: Jan. 9, 2014, Filed Date: Jul. 28, 2009, 7 pages.

Final Office Action received in Japanese Patent Application No. 2011-522116, Mailed Date: May 29, 2014, Filed Date: Jul. 28, 2006, 6 pages.

Notice of Allowance cited in U.S. Appl. No. 12/188,971, mailed Aug. 18, 2014.

"Sixth Office Action Issued in Chinese Patent Application No. 200980130775.8" mailed Date: Aug. 27, 2014, 7 pages.

* cited by examiner

FORM FILLING WITH DIGITAL IDENTITIES, AND AUTOMATIC PASSWORD GENERATION

CROSS-REFERENCE TO RELATED APPLICATIONS

This application is a divisional application from U.S. patent application Ser. No. 12/188,971 entitled "FORM FILLING WITH DIGITAL IDENTITIES, AND AUTOMATIC PASSWORD GENERATION," which was filed on Aug. 8, 2008, which is to issue as U.S. Pat. No. 8,910,256 on Dec. 9, 2014, and which is incorporated by reference herein.

BACKGROUND

A website will frequently request that a user provide personal information in order to use a service that the website provides. For example, the website may gather personal information to register a new account for the user, to authenticate the user, or to process the user's payment. In order to gather this information from the user, the website will often present the user with a "form". A form, or web form, is a structured web document with spaces, called "form fields", reserved for entering information. Forms are a ubiquitous means for gathering user input on the World Wide Web.

As people have become accustomed to providing personal information to web sites through forms, identity theft has increased. An identity thief may present a user with a web form—often resembling or exactly mirroring a web form of a trusted website—that requests personal information. The unsuspecting user may then provide the criminal with passwords, credit card numbers, or other personal information.

There are other problems that are specific to the use of username and password forms for website authentication. People often choose short passwords which are based on words in the dictionary or names. These types of passwords are easier to guess or crack than lengthy, randomized passwords. In addition, people commonly use the same password for multiple websites, which increases the level of risk they are exposed to if the password for one website is compromised. If a person wishes to use passwords that are lengthy, random and unique, personal password management becomes a serious chore, as the person may have difficulty remembering the passwords without writing them down.

In order to facilitate digital information exchange that is more secure, uniform and user-friendly, an open-ended, interoperable system of digital identification has been developed. This system of digital identification is often referred to as an "identity metasystem".

At least in one conventional implementation, the identity metasystem provides a secure mechanism by which a user can manage and use digital identities. The identity metasystem makes digital information exchange more uniform and user-friendly, and helps prevent identity theft by providing a secure means for users to provide information over the internet to verifiable parties. Some of the user's digital identities may be self-issued, whereas others may be provided by a trusted third-party. The entity—whether it be the user or a third-party—that issues a digital identity is called an "identity provider". A party, such as a website, that requests and uses information from a digital identity is referred to as a "relying party". If a user navigates to a website that is a legitimate relying party, browser-embedded "identity selector" software will allow the user to select an information card that represents a digital identity to be sent to the site. Once a digital identity is selected, the identity selector facilitates the secure exchange of encrypted packages of digital identity data called "security tokens" between the identity provider and the relying party. MICROSOFT® WINDOWS CARDSPACE® is an example of identity selector software.

BRIEF SUMMARY

Embodiments described herein relate to the use of digital identities to populate and submit form field data. Embodiments such as these have the potential to enable websites to be compatible with digital identities with less development effort than that involved in making a website compatible with the identity metasystem as it has previously been implemented. Embodiments described herein also provide a mechanism for the automatic generation and maintenance of usernames and passwords.

In an example embodiment, a computer application obtains a form field specification from a website that has a form. The form field specification identifies form fields of the form, to which data can be provided using a digital identity. Once the form field specification is obtained, the computer application prompts a user to select or create a digital identity. The computer application uses this digital identity to obtain data with which to populate one or more of the form fields of the form. The computer application populates the form fields of the form with the obtained data, and then the form field data is submitted to the website.

In another example embodiment, a computer application obtains username and password parameters from a website or an application. The computer application automatically generates a username and password that meet the specified parameters. The generated username and password pair is securely stored by the computer application. The username and password pair can be recalled by the computer application for future authentication with the website or application.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to form filling using digital identities and/or to the automatic generation of secure passwords. Embodiments described herein have the potential to enable websites to be compatible with digital identities with less development effort than that involved in making a website compatible with the identity metasystem as it has previously been implemented. In addition, embodiments described herein may streamline and increase the security of passwords-based authentication mechanisms and relieve computer users of burdens involved with password management for multiple websites and applications. Although some embodiments are described with respect to websites, one skilled in the art will understand that the techniques described herein may be applied to other applications, including various types of web applications and standalone computer applications.

As described in further detail hereinafter, in one embodiment, a website that has a form makes information available about the form fields that are contained within the form. The information may optionally include certain restrictions about the types and formats of data that can be input to the form fields. A user is prompted to select or create a digital identity. The selected digital identity may be associated with certain information about the user, and may be used to populate the various form fields of the form. The data from the selected digital identity is formatted such that it meets any restrictions that have been specified by the website. The data is then submitted to the website.

Alternatively or in addition, in another embodiment, a secure username and password pair may be generated to use with registration at a website or application and for future authentication at the website or application. The secure username and password pair may be associated with a digital identity.

First, a computing system in which various principles described herein may be employed will be described with respect to FIG. 1. Then, various embodiments which provide for form filling using digital identities and/or the generation of secure usernames and passwords will be described with respect to FIGS. 2 through 5.

Figure 1:
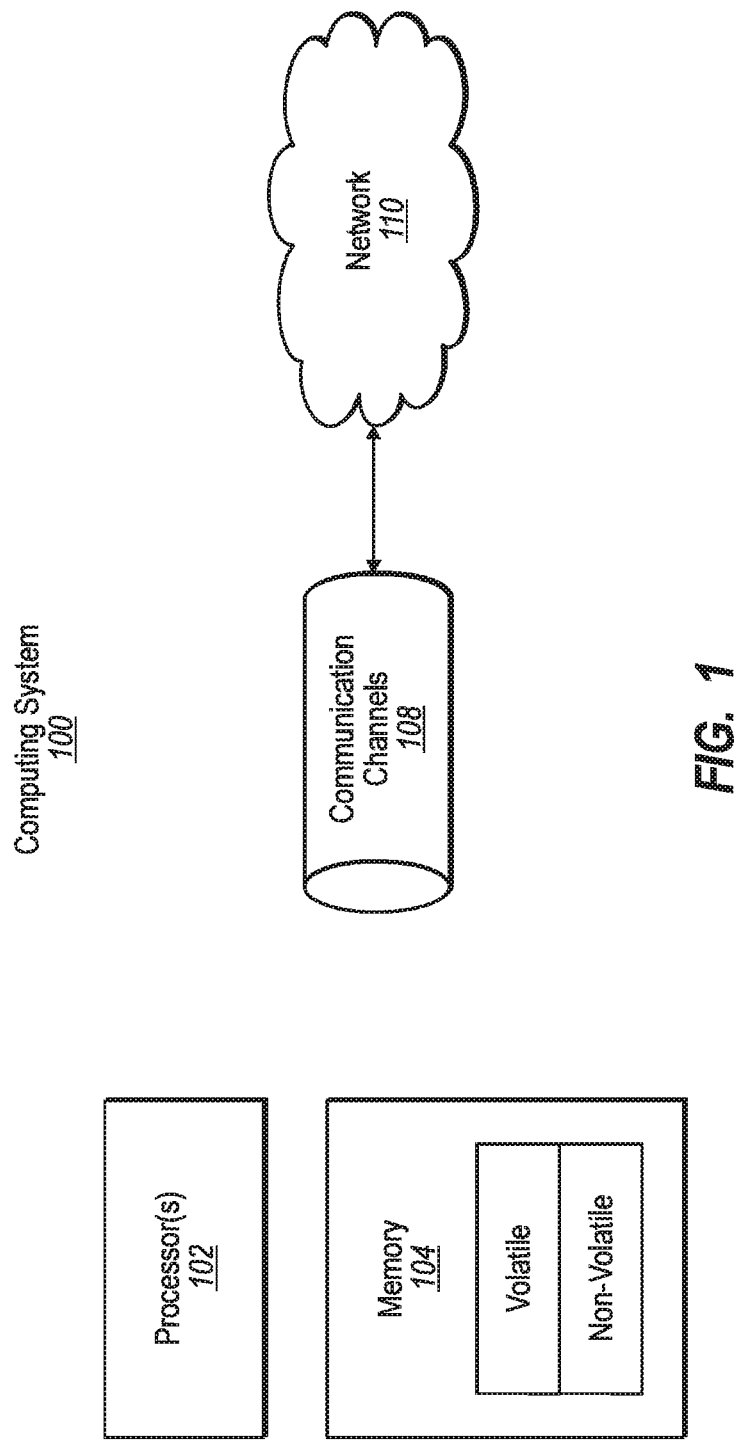
FIG. 1 illustrates an example computing system that may be used to employ embodiments described herein.

FIG. 1 illustrates an example computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
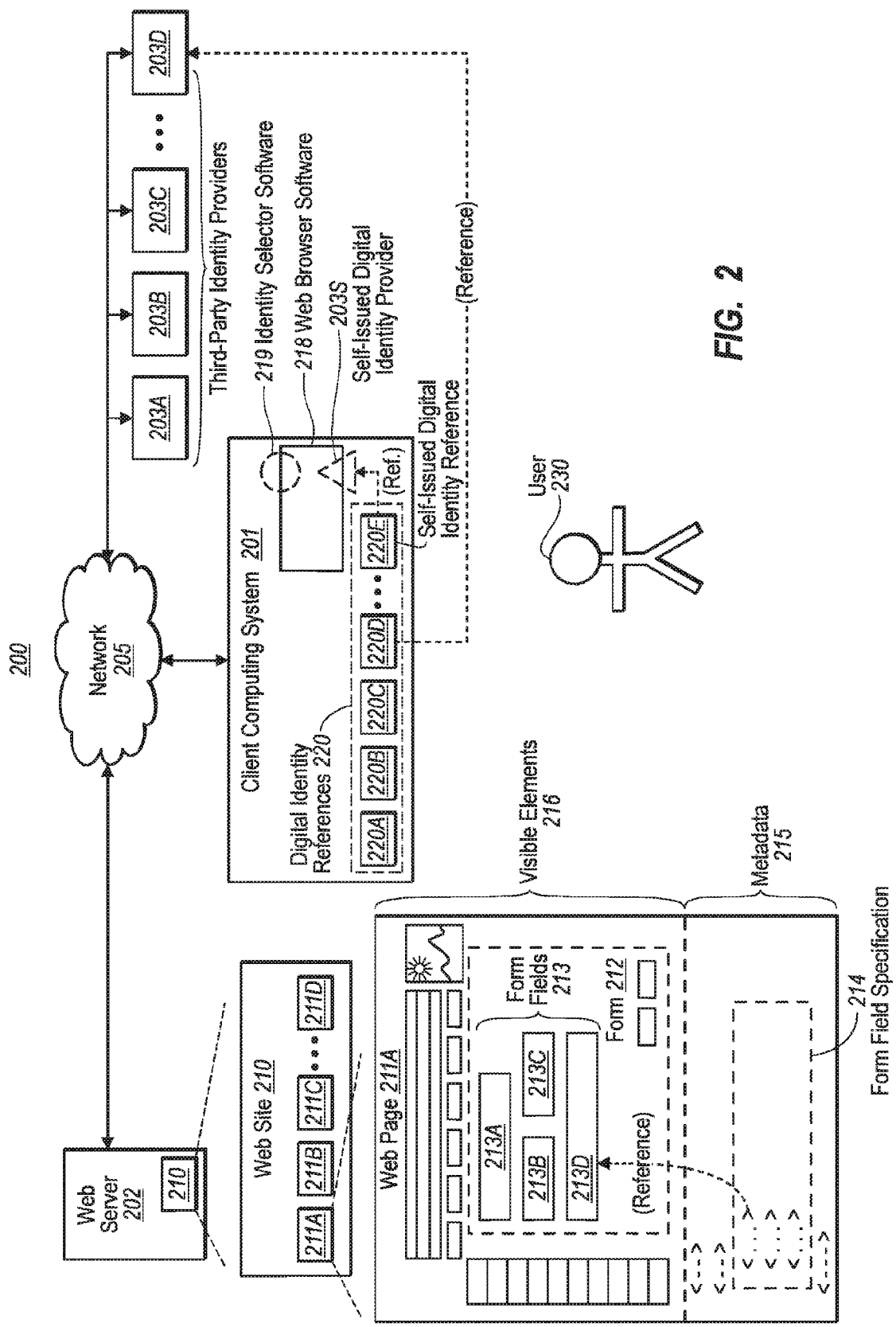
FIG. 2 illustrates an environment in which techniques for form filling using digital identities and in which automatic passwords techniques may be accomplished.

FIG. 2 illustrates a sample environment 200 in which techniques for form filling using digital identities as described herein may occur. The techniques for automated secure password generation may also be performed in the sample environment 200. FIG. 2 contains a client computing system 201 that may be, for example, structured like the computing system 100 of FIG. 1. The client computing system 201 is connected to a network 205. The network 205 may be the internet, or alternatively, the network 205 may be any network which connects the client computing system 201 to other components of the environment that are shown in FIG. 2 and described hereafter.

A web server 202, which may be structured like the computing system 100 of FIG. 1, contains computer executable instructions by which the web server 202 hosts a web site 210 that can be accessed by the client computer 201 through the network 205. The website 210 may contain one or more web pages 211A-D (sometimes referred to collectively in this description as "web pages 211"). Each of the web pages 211 may contain metadata 215, and visible elements 216 which may include both visible interactive elements and visible non-interactive elements. The web pages 211 may, in the traditional manner, be described using HTML, or, alternatively, may be provided to the client computing system in other languages, scripts, protocols or formats that are known in the art or that are to be developed in the future.

In an alternative configuration, the web site 210 may be hosted across multiple web servers that may be similar to the depicted web server 202. Additionally, the website 210 and/or web pages 211 may be provided through a distributed architecture, such as, for example, a distributed architecture that implements mechanisms which allow for web pages and other content to be mirrored and distributed across multiple web servers in order to facilitate a higher number of users, higher bandwidth availability, faster connection speeds, and so forth. Indeed, the techniques described herein may be compatible with any environment that involves forms, regardless of the number or type of web servers (if any) that implement the environment, and regardless of the means by which the web pages and other content might be distributed to the end-users in the environment.

The web site 210, or one or more of the web site's web pages 211, contains a form that contains multiple form fields. For example, in the case of web page 211A, which contains the form 212, the form 212 is illustrated as including form fields 213A-213D (referred to collectively as "form fields 213"). Although web page 211A is shown in some detail, some or all of the features attributed to web page 211A may optionally be attributed to other web pages 211 as well. For instance, one or more of the other web pages 211 may also have a form. However, typically, the number, identity, and layout of form fields within a form may often differ from one form to another.

Generally, as the term is used herein, and as the term is known in the art, a "form" is a structured document with spaces reserved for a user to input information, and a "form field" is a space in a form where a user or other entity can enter a specific item of information. In addition to containing a form 212 with form fields 213, the web page 211A of the web site 210 may also contain a form field specification 214 that references one or more (but not necessarily all) of the form fields 213. The form field specification 214 and the references contained therein provide information to the client computing system 201 that identifies the form fields that should be filled in by form filling methods and techniques described herein.

The form 212, form fields 213 and form field specification 214 may all be contained within a single web page 211A, or, alternatively, may be parts of multiple web pages such as the illustrated web pages 211. Alternatively, the form 212, form fields 213, and form field specification 214 may be made available to the client computing system 201 through means other than conventional, graphically rendered web pages, such as through a direct information exchange between the web server 202 and the client computing system 201, or through applications, including web applications, that are not considered to be traditional web pages.

In at least embodiments where the form field specification 214 is provided to the client computing system 201 as part of the one or more web pages 211, the form field specification 214 may be included as part of the metadata 215 of the web page. The data in the form field specification 214 may be organized as any of multiple types of data structures that are known in the art, or that are yet to be developed. For example, one conventional mechanism is to organize data structures using markup language such as, for example, in an XML or HTML data structure. Alternatively, the form field specification 214 may simply be described within one or more tags within the markup language (such as HTML) that describes the web page.

As another alternative to providing the form field specification 214 to the client computing system 201 as part of the web page metadata 215, the form field specification 214 may be provided to the client computing system in a more direct manner through the network 205 such as through any of various means that are known in the art or have yet to be developed, including, for example, data packets sent across the network through a known protocol such as TCP or UDP. However, there are any number of other mechanisms that may be used to send data over a network. Any of those mechanisms may be used to send the form field specification 214 to the client computing system 201 consistent with the principles described herein.

The form field specification 214 might optionally specify one or more form field restrictions for the form fields that are referenced therein. These form field restrictions are often parameters or limitations on the data that can be input into the form fields that the form field specification 214 references. Examples of form field restrictions include (but are not limited to) the following: whether a specified form field is required or not, a minimum and/or maximum length restriction for data input to the form field, a required character set to be used when filling in the form field, required or prohibited character types, and so forth. A form field specification 214 may also include form field restrictions that are specific to username and password form fields that are referenced in the form field specification 214. This would be an example of a "username and password specification", as discussed below with respect to FIG. 4.

The client computing system 201 may display the visible elements 216 of the web page 211A in an implementation of web browser software 218 which contains computer-readable instructions that cause the client computing system 201 to perform, in addition to functionalities that are commonly performed by web browsers, the methods and techniques described for form filling using digital identities that are described in further detail hereinafter. A user 230 may interact with the client computing system 201, and particularly with the web browser software 218. Although embodiments described herein are described in conjunction with web browser software 218, it is understood that computer-executable code which causes the client computing system 201 to perform any of the techniques described herein may be incorporated into various types of computer applications, including applications implemented in software and/or hardware.

The client computing system 201 includes one or more digital identity references 220A-E (referred to collectively as "digital identity references 220") which reference one or more digital identities that a user may have at her disposition. These digital identity references 220 may be stored in the various computer-readable media that were described previously with respect to FIG. 1. For example, the digital identity references 220 may be stored in non-volatile storage media that is local to the client computing system 201, or alternatively, the digital identity references 220 may be stored on a portable device such as a flash memory drive or a smart card. However, there is no limit to the manner in which the digital identity references 220 may be stored.

The digital identity references 220 contain information that allows computer-executable code, executed by the client computing system 201, to connect to one or more identity providers, as illustrated by identity providers 203A-D & 203S (referred to hereinafter as "identity providers 203"). Third-party identity providers 203A-D, as referenced by digital identity references 220A-D, may be implemented in servers that are structured like the computing system 100 that is illustrated in FIG. 1. A connection to these third-party identity providers is provided to the client computing system 201 through the network 205. Examples of third-party identity providers 203A-D include government agencies which provide digital identities, credit card providers, clubs or groups in which the user 230 has a membership or affiliation, certificate issuing agencies such as VERISIGN® INC., and so forth. These are only a few examples of third-party identity providers, as virtually any entity that provides information for a user in the form of a digital identity may be considered a third-party identity provider.

In addition, some digital identity references, as illustrated by digital identity reference 220E, may reference self-issued digital identities which are issued by a self-issued identity provider 203S (also referred to as "self-issued identity provider software 203S"). A self-issued identity provider 203S may be implemented in computer executable code that resides in the memory of the client computing system 201 and that, when executed, allows a user 230 to create, store and/or access digital identities which contain some information about the user. The computer-executable code which comprises the self-issued identity provider 203S may be incorporated as part of the web browser software 218, as part of the identity selector software 219 (discussed in detail below), as part of another software product, or, alternatively, as stand-alone software. This flexibility in the management of the self-issued identity provider 203S is represented symbolically in FIG. 2 by having the self-issued identity provider 203S only partially overlap with the web browser software 218.

The client computing system 201 may include identity selector software 219. The identity selector software 219 presents a graphical interface to the user 230 wherein graphical representations of the digital identity references 220 (and thereby the corresponding identities) are displayed. The identity selector software 219 also provides a means by which the user 230 may provide a selection from the graphical representations of digital identity references that are being displayed. The identity selector software 219 may be incorporated as part of the web browser software 218 or, alternatively, may be part of a separate or standalone application. This is symbolically represented in FIG. 2 by having the identity selector software 219 be only partially overlapping with the web browser software 218. In some implementations, in which the identity selector software 219 is incorporated outside of web browser software 218, there may be no need for web browser software 218 to even be present on the client computing system 201.

The digital identity references 220 may be presented to the user by the identity selector software 219 as information cards or other visual representations of digital identities. Each information card may provide the user with a visual display of information about the digital identities that the card represents. There is really no limit to the types of digital identities that such cards may represent using the principles described herein. However, the use of specific examples can help to elucidate the broader principles described herein. Accordingly, as an example only, a digital identity might represent a government issued digital identity that claims the user is a certain age. In this example, the digital identity reference might contain a reference to a government identity provider, which may be, for example, one of the third-party identity providers 203A-D. In this example, suppose the government identity provider is willing to vouch for and verify the claim of the user's age. In that case, continuing with this example, the information card that represents the digital identity reference might provide a graphical display that identifies to the user that the identity provider which provides the digital identity that the digital identity reference refers to has capabilities to issue an age-verification identity.

Although some of the embodiments discussed herein are described with reference to web pages and a web environment (for example, the web pages 211 illustrated in FIG. 2), it would be understood to those of ordinary skill in the art after having read this description that concepts and techniques that are implemented in embodiments described herein may be applied to various environments and technologies that may not incorporate conventional web pages. For example, with respect to embodiments that involve the use of forms, forms are commonly used in a variety of computer applications that are not web pages. Forms may be used in WORDPERFECT® documents or in MICROSOFT® OFFICE documents. Forms may be used in various web applications that are not typically though of as "web pages", such as web applications that are developed using MACROMEDIA® FLASH® technology. Indeed, forms may be used in virtually any standalone or other computer application that requires a user to input data.

Some components of the above mentioned environment 200 have been implemented in other computing environments and applications that are known in the art, although in many cases with different functionality than that described herein. For example, a platform that involves methods for digital identity exchange, including the use of identity selectors and identity providers, is commonly known in the art as an "identity metasystem." As a further example, MICROSOFT® WINDOWS CARDSPACE® includes, among other things, an implementation of identity selector software which presents a user with information cards that contain references to one or more digital identities that are provided by identity providers. This is noted by way of background in order to illustrate that some of the useful techniques and mechanisms that are disclosed herein may be implemented in conjunction which existing identity metasystem structures and other structures that are known in the art, albeit with suitable modification to adapt to the principles described herein.

Figure 3:
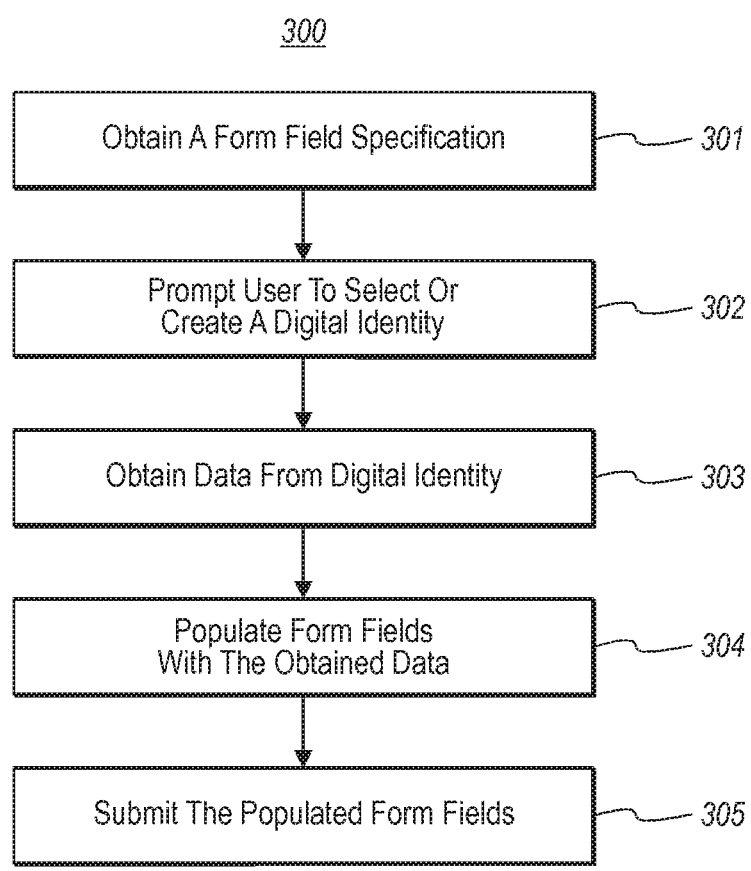
FIG. 3 illustrates a flowchart of a method for web form filling using data obtained with digital identities.

FIG. 3 illustrates a method 300 for populating form fields with data obtained using a digital identity. The method 300 may be carried out in an environment similar to the environment 200 that is illustrated in FIG. 2. One or more computing systems, such as the client computing system 201 and other computing systems connected to the client computing system 201 through the network 205, may execute computer-executable instructions contained on computer-readable media which cause the computing system(s) to perform the acts described in the method 300.

The method 300 includes an act 301 of obtaining, from a web site, a form field specification that specifies form fields of a form. For instance, in the context of FIG. 2, the client computing system 201 may obtain the form field specification 214 of the form 212 from the web site 210. Recall that the form 212 specifies a number of form fields 213, and that the form field specification 214 may reference one or more of the form fields 213. In addition, the form field specification 214 may optionally specify one or more form field restrictions for one or more of the form fields 213 of the form 212, as previously discussed.

As an example, the form field specification 214 obtained in act 301 may refer to form fields 213 of a form (referred to herein as a "registration form") 212 that is for registering a new account for the user 230 at the web site 210. The web site 210 may, alternatively or additionally, contain another form (referred to herein as a "login form"), also of a similar format as form 212, that is for authenticating or logging in to the web site 210. However, forms may be used for any one or more of these or a variety of other purposes. In any case, one of the form fields 213 could be a password field—for a new password in the case of a registration form or for an existing password in the case of a login form. Other examples of possible form fields 213 could be a user name field, credit card information fields, a passport identifier field, a country of citizenship field, an age field, a marital status field, address information fields, criminal record fields, occupation fields, and so forth. However, the principles described herein are not limited to the types of information that are described in association with the form fields 213. In at least one embodiment, the form fields 213 may consist of textual information. However, in some embodiments, as examples only, the information might additionally or alternatively be a file, a list, a graphically displayed object, a calendar date selection, or any other type of information. The principles described herein have no limit to the type of the information that is utilized, and embodiments may utilize one or more of a variety of different types of information.

The method 300 illustrated in FIG. 3 also includes an act 302 of prompting a user of the computing system to either select or create a digital identity that will be used to provide at least one value into at least one of the form fields of the form. The user 230 may be prompted by the identity selector software 219 to select a digital identity reference from the one or more digital identity references 220 that are available to the user. As discussed previously, the digital identity references 220 may be presented to the user in the form of information cards or other graphical representations of digital identities, and each graphical representation may present to the user 230, for example, a brief synopsis of the digital identity that the graphical representation represents.

In at least one embodiment, the user 230 may choose to create a new digital identity, rather than to select a preexisting digital identity. When this choice is made, the self-issued identity provider software 203S may be activated, and the user 230 may provide input—for example, through a graphical interface—that the self-issued identity provider software 203S may use to create a digital identity to be used in the method 300. There may be a variety of other mechanisms by which a user can create a new digital identity. Alternatively, rather than choosing to create a new digital identity, the user 230 may choose to select one of an existing set of digital identity references 220A-E. The chosen digital identity reference may reference an existing digital identity from a third party identity provider 203A-D or alternatively may reference a digital identity from the self-issued identity provider 203S.

The next act 303 in the method 300 consists of obtaining, using the digital identity reference that the user selected or created in the previous act 302, data that may be used to populate one or more of the form fields 213 of the form 212.

As an example illustration of one application of this act 303, if the user 230, previously in act 302, had selected, for example, a digital identity reference 220A which refers to a digital identity that is provided by a third-party identity provider 203A, the client computing system 201 connects through the network 205 to the third-party identity provider 203A that the selected digital identity reference 220A refers to. The third party identity provider 220A may then provide the client computing system 201 with the data fields (also known as "claims") that the selected digital identity contains. The data may be transferred through some secure means or protocol that is known in the art or that is developed in the future. The data may be packaged into any of a variety of different types of packages that are collectively referred to as security tokens, both in this description and in the art. A security token may be any type of data package that is known in the art or which may be developed in the future, including secure data packages such as, for example, SAML tokens.

Continuing with the illustrative example of the previous paragraph, if the user had previously (in act 302) either selected a digital identity reference 220E which referred to a self-issued digital identity or chosen to create a new self-issued digital identity, the self-issued identity provider 203S that resides on the client computing system 201 may provide a security token that represents data included within the user-selected or user-created digital identity. This data may be encapsulated in a package that may be similar to a security token, as discussed in the previous paragraph. Alternatively, the data obtained from the self-issued digital identity may be communicated directly to software that is performing the method 300.

Once the data is received in act 303, the method 300 includes an act 304 of populating one or more of the form fields 213 specified in the form field specification 214 with the obtained data. The data received in the previous act 303 may need to be extracted from a security token and/or transformed before it can be used to populate one of the form fields 213. For example, in an embodiment where a security token is received from an identity provider 203, the security token may need to be "opened" and/or parsed in order to extract simple textual data or other data (in the case of non-textual form fields) that is a compatible input to the form fields 213 that are specified in the form specification 214. Furthermore, the data may be formatted or transformed so that it meets any or all of the optional form field restrictions that are indicated in the form field specification 214.

Once the data has been used in act 304 to populate one or more of the form fields 213 that were specified in the form field specification 214, the method 300 involves an act 305 of submitting the populated form fields to the web site 210. This act 305 of data submission may be performed by the client computing system 201 automatically and without further user interaction beyond the user interaction that may have occurred when the user 230 selected a digital identity in a previous act 302. Alternatively, the user 230 may need to provide some further interaction to the client computing system 201 before the populated form fields may be submitted. In one example, the user 230 may need to click a confirmation button in a dialog box in order to confirm that the form 212 is ready to be submitted. However, although clicking a button in a dialog box is one common example of a user interaction, the user may be required to provide one or more of many interactions that are possible between the user 230 and the client computing system 201 before the data is submitted to the website 210 in this act 305.

In one or more embodiments, the manner by which the populated form fields are submitted to the web server 202 may involve the web browser software 218 on the client computing system submitting the data to the web server 202 in the same way that the data would have been submitted had the user 230 manually entered the data into the form 212 and submitted the form to the website 230. In this example, the web browser software 218 may simulate a user clicking a "submit" button or interacting with a similar user-interface element. Alternatively, the web browser software 218 may simply send an HTTP request to the web server 202 that contains the populated form field information. While these are two example implementations of submitting form fields to a web server, there are various other means that are known in the art or which may be developed in the future by which the client computing system 201 could submit the populated form field data to the web server 202 through the network 205.

In one or more embodiments, before or during the course of carrying out the method 300, the web browser software 218 and/or identity selector software 219 may attempt to detect that the web site 210 is compatible with the techniques of method 300 before proceeding with the method 300. As one example of how this compatibility detection may occur, the web browsing software 218 may detect that the web page 211A contains a properly formatted form field specification 214 before proceeding with the execution of the method 300. On the other hand, the web browsing software 218 may recognize that the web page 211A does not have a properly formatted form field specification, and will not proceed with the execution of the method 300. This form field specification detection technique is simply one example of how the methods and techniques described herein may be selectively performed based on the existence of some condition; the techniques described herein could potentially depend on one or more conditions that may be different than or in addition to the one used in this illustrative example. Furthermore, the detection of some condition, such as is described in the example described in this paragraph, is entirely optional for method 300 and other techniques described herein; embodiments may exist which do not depend on the existence of any condition at all.

Figure 4:
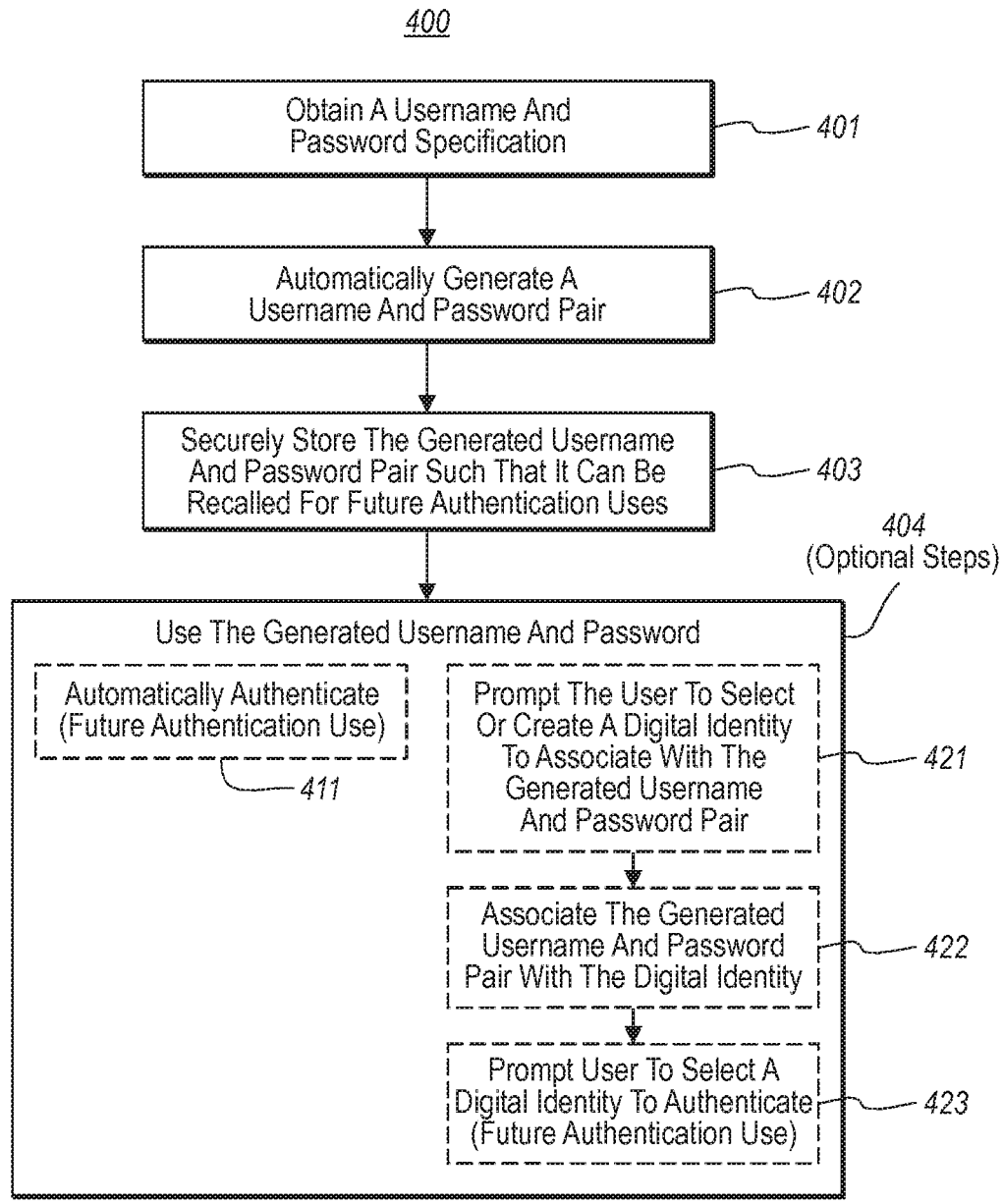
FIG. 4 illustrates a flowchart of a method for the automatic generation and storage of secure username and password pairs.

FIG. 4 illustrates a flowchart of a method 400 for automatically and securely generating a username and password pair.

The method 400 includes an act 401 of obtaining a username and password specification of an application or website. In the case of a website 210, the username and password specification may be contained in the form field specification 214 or may be communicated by other means of transferring data across a network 205, as discussed previously. In the case of an application, the username and password specification could comprise some other structure by which the application indicates that a username and password are requested to access at least some of the functionality of the application. Additionally, the username and password specification may optionally specify various restrictions on usernames and passwords that are to be provided to the application or website. For example, there could be length restrictions (minimum or maximum), a required or limited character set, required or prohibited character types, limitations on the usage of dictionary words or names or simple variations of the same, or many other conceivable restrictions or parameters which generated usernames and passwords should accommodate in a particular case.

Next, the method 400 includes an act 402 of automatically generating a username and password pair which conforms to the obtained username and password specification. The generated username and password should meet all of the restrictions, limitations and parameters that were included in the username and password specification, if any were included at all.

The generation process could optionally also impose its own restrictions on usernames and passwords that may be generated by the process, in addition to restrictions that are specified in the username and password specification. For example, the generation process could impose its own restriction against using dictionary words or names, or it could always make passwords that are the maximum length supported by the website or application. In such an example, the restrictions of the specification are added upon or made more restrictive by the generation process. As another example of a self-imposed restriction, the generation process could impose a restriction that any generated username and password pair should be unique from username and password pairs previously created for other applications or websites during the generation process. These examples of self-imposed restrictions are merely a few of a wide variety of possible restrictions that could be imposed upon a password-generation process. In some embodiments, self-imposed restrictions may be entirely optional or not present.

After the username and password pair is generated in act 402, the generation process 400 includes an act 403 of storing the generated username and password such that it can be recalled by the computing system for future authentication at the application or website. The username and password may be stored either locally, or, alternatively, on a device or storage media that is not included within the client computing system 201. There is no limit to how the username and password may be stored. In some embodiments, the username and password may be stored in an encrypted and secure manner such that only the application which generated the pair can decrypt the stored username and password pair for future use.

In alternative embodiments, the username and password pair may be stored in more than one place; for example, the user may have the stored username and password on both the client computing system and a portable computing device such as a laptop, PDA, or cell phone. Another possibility is that the pair may be securely stored on portable storage media such as flash memory or on a portable device such as a smart card, such that the generated username and password pair can be used on any computer which the user 230 has occasion to access. These are just a few of many possibilities of how a username and password that are generated by the techniques described herein may be stored and used.

Once the generated username and password pair is stored in such a way that the pair can be recalled for future authentication at the website or application, there are further, optional steps 404 that can be taken with the generated pair.

For example, in one optional step that is illustrated in act 411, the generated username and password pair may be used to automatically authenticate to the website or application for which the pair was generated. In embodiments which involve a website 210, when the user 230 returns to the website 210 for which a username and password was previously generated (as discussed with respect to acts 401-403), computer executable code on the client computing system 201 may cause that the generated pair be used to automatically login to the web site 210. Alternatively, in embodiments that involve an application other than a website, including an application of the many different types of applications that may be enabled to employ the techniques described herein, the generated username and password pair may be used in act 411 to automatically login to the application.

In embodiments which are specific to password generation for website authentication, once the generated pair has been stored, the computing system may prompt the user (as illustrated in the act 421) to select or create a digital identity to associate with the generated username and password pair. Once the user selects or creates a digital identity to associate with the generated pair, the generated pair is associated with the digital identity as illustrated in act 422. In addition to being associated with the digital identity, the generated pair may optionally be associated with the website such that, when the website is visited subsequently, the username and password have a known association with the website and this association may be used to provide additional authentication functionality to applications such as the web browser software 218 or the identity selector software 219.

In an alternative configuration of the method 400, the optional acts 421 and 422 could be performed before the act 403 of storing the generated username and password pair. In any case, in embodiments which include the optional acts 421-423, as an example of a future authentication use, when the user 230 navigates to a web site 210 which is compatible with techniques described herein and the web site 210 requires that the user 230 authenticate in order to access certain features contained therein, the user is prompted in act 423 to select a digital identity. This prompting to select a digital identity may be done in a similar manner as that described previously with respect to act 302 of the method 300. Once the user 230 selects a digital identity that is associated with a username and password pair for the website, the user 230 will then be automatically authenticated or logged in to the website, similar to the act that is illustrated in act 411 and described above. In such an embodiment, for example, the act 423, which includes using the generated pair for automatic authentication at the web site 210 after the user 230 has selected a digital identity, may involve the username and password pair being used to populate form fields 213 which are then submitted to the website 210, similarly to the techniques for populating and submitting form field data that are illustrated in acts 303-305 of method 300, as illustrated in FIG. 3.

One advantage of embodiments which involve the method 400 illustrated in FIG. 4 is that the user 230 would not need to remember or write down the generated username and password pair. Additionally, it would be difficult or impossible for another person to obtain the username and password for unauthorized use.

While the method 400 is discussed in the context of the generalized concept of username and password pairs, it is recognized that there are a variety of different authentication mechanisms which utilize passwords. In such systems, a password is often coupled with some supplemental identification information, which could be a username, the example used in the illustrations of FIG. 4 and throughout the discussion herein, but which could alternatively be any of a variety of other means for identification. Another common example of a means for identification would be the use of an email address in conjunction with a password for authentication. There are other mechanisms for user identification, including more sophisticated mechanisms such as, for example, smart cards and biometric technologies. However, these are just a few illustrative examples of technologies which use passwords. The techniques described herein may be applied to any authentication system which could benefit from the secure automatic generation of passwords, regardless of whether the system involves username and password pairing or some other method of user identification and authentication.

In some embodiments, the method 400 could be used to supply a username and a password for a web site, in which case the environment of FIG. 2 applies. In such an embodiment, the username and password may be supplied to the web site 210 through a form 212. Thus, the techniques of FIG. 4 may be utilized in conjunction with a method such as that of FIG. 3. For example, a username and password specification may be obtained from the web site 210 as part of the form field specification 214 obtained in act 301. As a further example, the generated username and password may be submitted to the form 212 in a similar manner as is illustrated in act 305 and described herein with reference to act 305. Furthermore, in some embodiments, the client computing system 201 may include web browser software 218, and the method 400 may be executed by computer executable code that is executed as part of or in conjunction with the web browser software 218 or identity selector software 219.

In alternative embodiments, the method 400 could be executed by a stand-alone application which contains computer executable instructions that perform the method, or the method could be executed by a code module that is part of a larger application or code library.

Figure 5:
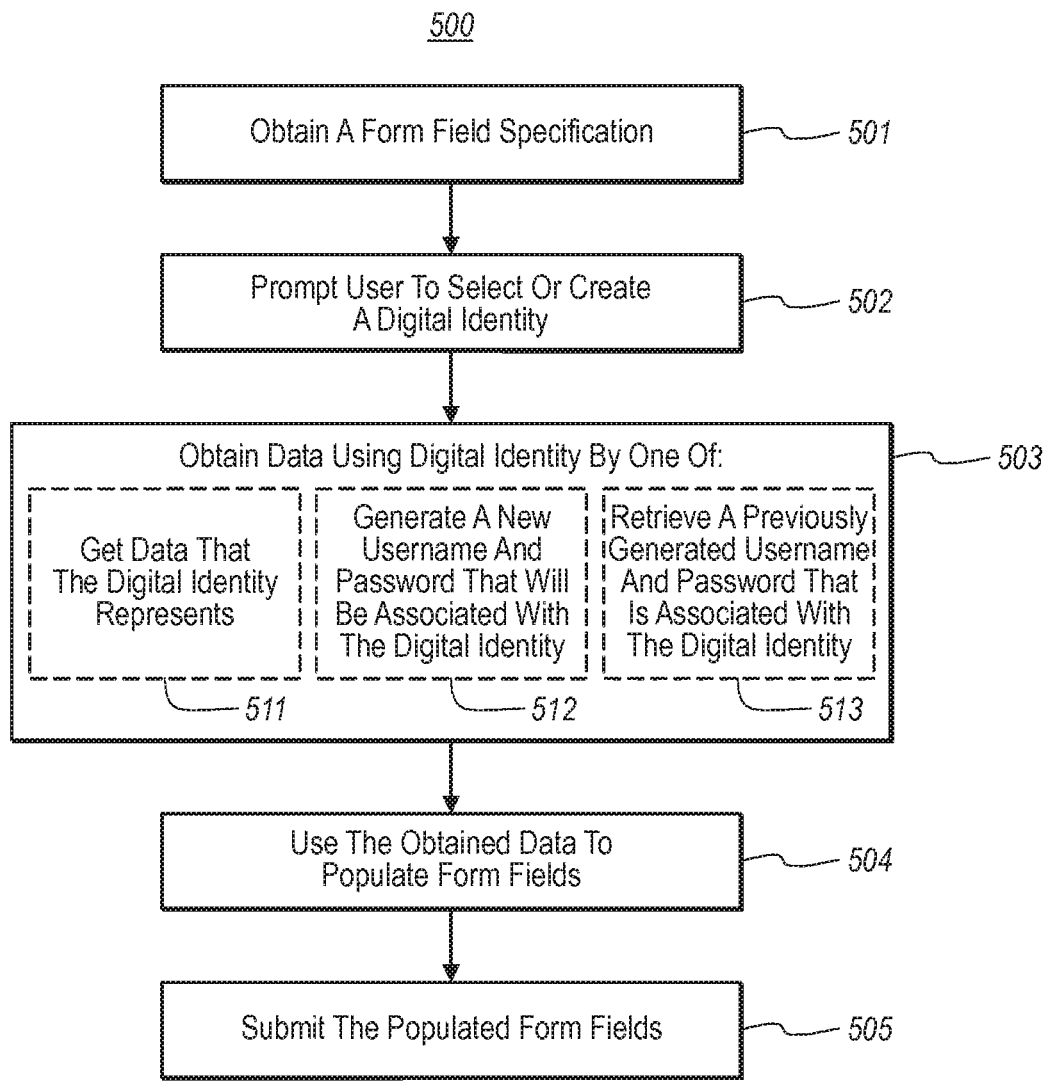
FIG. 5 illustrates a flowchart of a method that incorporates both web form filling and automatic password generation using digital identities.

The methods and techniques 300 and 400 that are illustrated in FIGS. 3 and 4, when executed in an environment similar to that illustrated in FIG. 2, can be combined to create a hybrid system which does both the form filling of method 300 and incorporates the automatic generation of secure usernames and passwords that is demonstrated in method 400. Such a method 500 is illustrated in FIG. 5 and may allow for significant automation of both the registration and the authentication processes that are commonly used to access features provided by the website 210, among other benefits.

For example, in an environment such as the one which is illustrated by the environment 200 of FIG. 2, the method 500 may include an act 501 of obtaining a form field specification 214, which specifies a plurality of form fields 213 of a form 212. The form field specification 214 may include form field restrictions for one or more of the form fields 213 of the form 212, as has been previously described. This act 501 is similar to the act 301 illustrated in FIG. 3. Next, in act 502, the user 230 is prompted by the client computing system 201 to select or create a digital identity. Subsequently, in act 503, the digital identity is used to obtain data to populate at least one of the form fields 213 of the form 212 that are specified in the form field specification 214. This may involve the use of digital identities from third-party identity providers 203A-D or self-issued digital identity providers 203S and may involve the transfer and parsing of security tokens that has been discussed previously in conjunction with act 303.

Depending on the type of data that the website 210 requires, the digital identity may be used to obtain data from various different sources, as illustrated in act 503. This is further illustrated in FIG. 5 by three boxes 511, 512 & 513 which are contained within the box that represents act 503. Thus, the performance of act 503 may consist of any one or more of the acts described depicted in 511, 512 & 513 and described below.

In one scenario, as illustrated in act 511, when a user 230 is accessing a website 210 and the website 210 is requesting information about the user 230, data may be obtained directly from information contained within or represented by the digital identity. For example, the user may be accessing the website 210 to register a new account, and the website may be requesting information about the user in order to register the new account. Techniques for obtaining data from a digital identity may be similar to those described above, for example, with respect to act 303 of FIG. 3.

In another scenario, illustrated in act 512, wherein the website 210 is asking the user to supply a new username and password, the digital identity may be used to generate a new and unique username and password pair, using a similar process as that discussed previously in conjunction with method 400. This act 512 may occur as an alternative or in addition to acts 511 and/or 513.

In a scenario, depicted in act 513, where a user 230 is returning to a website 210 that the user 230 had visited previously, and the website 210 is asking that the user 230 provide an existing username and password for authentication purposes, the digital identity may be used to retrieve a previously generated username and password pair and to supply this generated pair to the website 210 in order to authenticate the user 230.

Once the digital identity has been used to obtain any of the data that is discussed above, in act 504, the data is used to populate one or more of the form fields 213 of the form 212 that were specified in the form field specification 214. Finally, the populated form fields are automatically submitted, as illustrated in act 505. Acts 504 and 505 have close analogues in acts 304 and 305 of method 300, and the descriptions provided in conjunction with FIG. 3 may be applicable.

Accordingly, the principles described herein provide a flexible mechanism for form-filling using digital identities and/or the automatic generation of secure username and passwords. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage devices having encoded thereon computer-executable instructions that, when executed by one or more processors of a computing system, causes the computing system to perform the following:
   accessing a username and password specification of a remote application or website, the specification comprising restrictions on the format of acceptable usernames and passwords including at least a required character set and minimum length for each of the usernames and passwords;
   automatically generating a username and password pair which conforms to the accessed username and password specification and conforms to the format restrictions;
   securely storing the generated username and password pair such that it can be recalled by the computing system for future authentication at the application or website.

2. A computer program product in accordance with claim 1, wherein the one or more computer-readable storage devices are magnetic and/or optical devices.

3. A computer program product in accordance with claim 2, wherein the generated username and password pair is unique from username and password pairs generated by the computing system for other applications or websites.

4. A computer program product in accordance with claim 3, which also causes the computing system to automatically login or otherwise authenticate to the application or website to which the generated username and password pair corresponds.

5. A computer program product in accordance with claim 3, wherein the computing system comprises a web browser client computing system and the application or website comprises a website.

6. A computer program product in accordance with claim 5, which also causes the computing system to prompt a user to select or create a digital identity to use for subsequent authentication at the website.

7. A computer program product in accordance with claim 6, which also causes the computing system to associate the generated username and password pair with the website and with the user-selected or user-created digital identity.

8. A computer program product in accordance with claim 7, which also prompts the user to select a digital identity when the website which is associated with the generated username and password pair is subsequently visited, and which also causes the computing system to automatically login or otherwise authenticate to the website.

9. A computing system comprising one or more processors and one or more computer-readable storage devices having encoded thereon computer-executable instructions that, when executed by the one or more processors, causes the system to perform the following:
   accessing a username and password specification of a remote application or website, the specification comprising restrictions on the format of acceptable usernames and passwords including at least a required character set and minimum length for each of the usernames and passwords;
   automatically generating a username and password pair which conforms to the accessed username and password specification and conforms to the format restrictions;
   securely storing the generated username and password pair such that it can be recalled by the computing system for future authentication at the application or website.

10. A system in accordance with claim 9, wherein the one or more computer-readable storage devices are magnetic and/or optical devices.

11. A system in accordance with claim 9, wherein the generated username and password pair is unique from username and password pairs generated by the computing system for other applications or websites.

12. A system in accordance with claim 9, wherein the computing system is caused to automatically login or otherwise authenticate to the application or website to which the generated username and password pair corresponds.

13. A system in accordance with claim 9, wherein the computing system comprises a web browser client computing system and the application or website comprises a website.

14. A system in accordance with claim 13, which also causes the computing system to prompt a user to select or create a digital identity to use for subsequent authentication at the website.

15. A system in accordance with claim 14, which also causes the computing system to associate the generated username and password pair with the website and with the user-selected or user-created digital identity.

16. A system in accordance with claim 15, which also prompts the user to select a digital identity when the website which is associated with the generated username and password pair is subsequently visited, and which also causes the computing system to automatically login or otherwise authenticate to the website.

17. A method performed in a computing system, the system comprising one or more processors and one or more computer-readable storage devices having encoded thereon computer-executable instructions, the method comprising executing the instructions on the one or more processors of the computing system thereby causing the computing system to perform the following:
- accessing a username and password specification of a remote application or website, the specification comprising restrictions on the format of acceptable usernames and passwords including at least a required character set and minimum length for each of the usernames and passwords;
- automatically generating a username and password pair which conforms to the accessed username and password specification and conforms to the format restrictions;
- securely storing the generated username and password pair such that it can be recalled by the computing system for future authentication at the application or website.

18. A method in accordance with claim 17, further comprising causing the computing system to prompt a user to select or create a digital identity to use for subsequent authentication at the website.

19. A method in accordance with claim 17, wherein the generated username and password pair is unique from username and password pairs generated by the computing system for other applications or websites.

20. A method in accordance with claim 17, further comprising causing the computing system to automatically login or otherwise authenticate to the application or website to which the generated username and password pair corresponds.

* * * * *